Feb. 21, 1956  J. W. W. GRIER ET AL  2,735,456
PORTABLE SAW GUIDE AND MITER ATTACHMENT
Filed Jan. 6, 1954  4 Sheets-Sheet 1
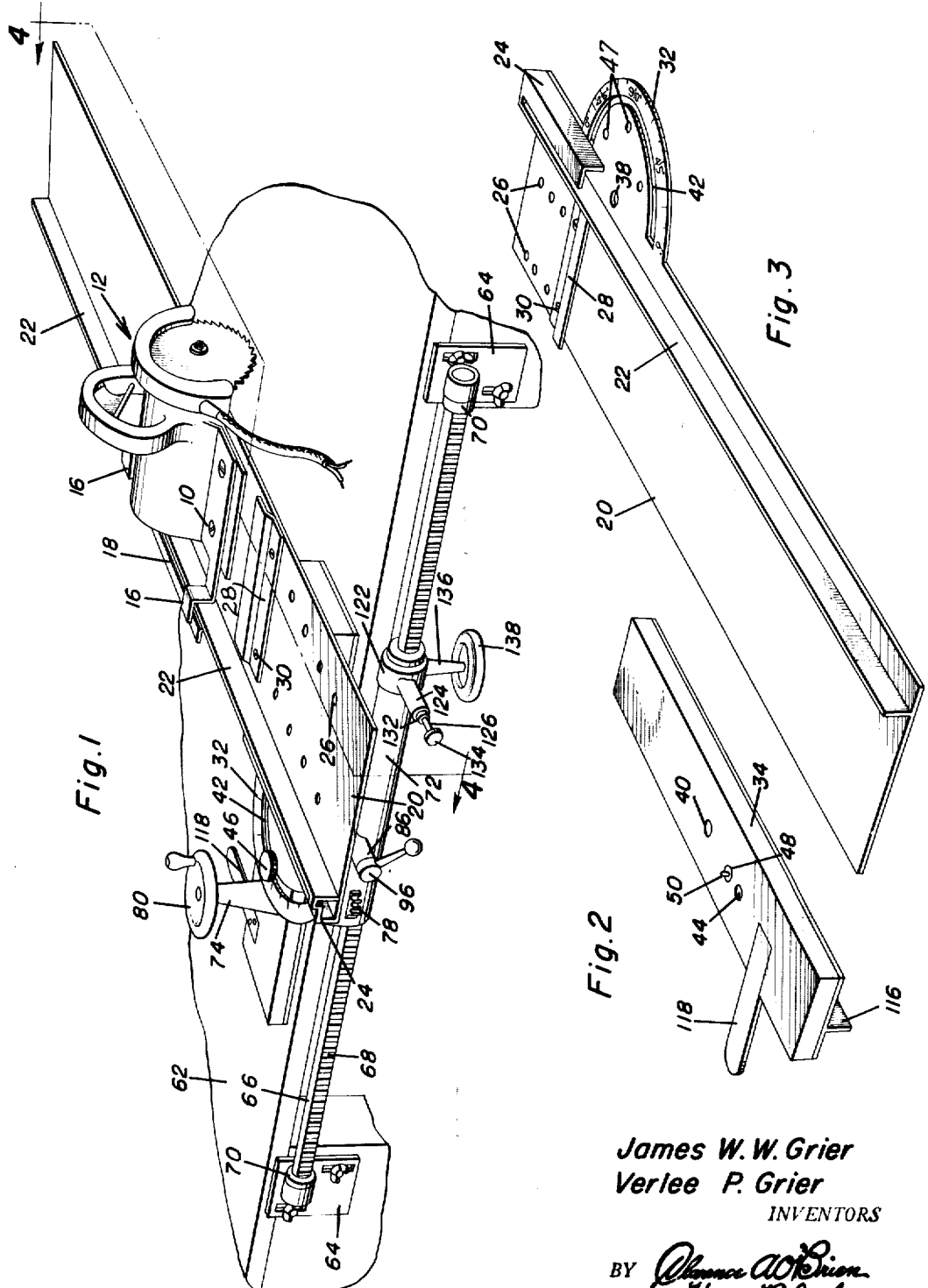
James W. W. Grier
Verlee P. Grier
INVENTORS
BY *Clarence A. O'Brien*
*and Harvey B. Jacobson*
Attorneys

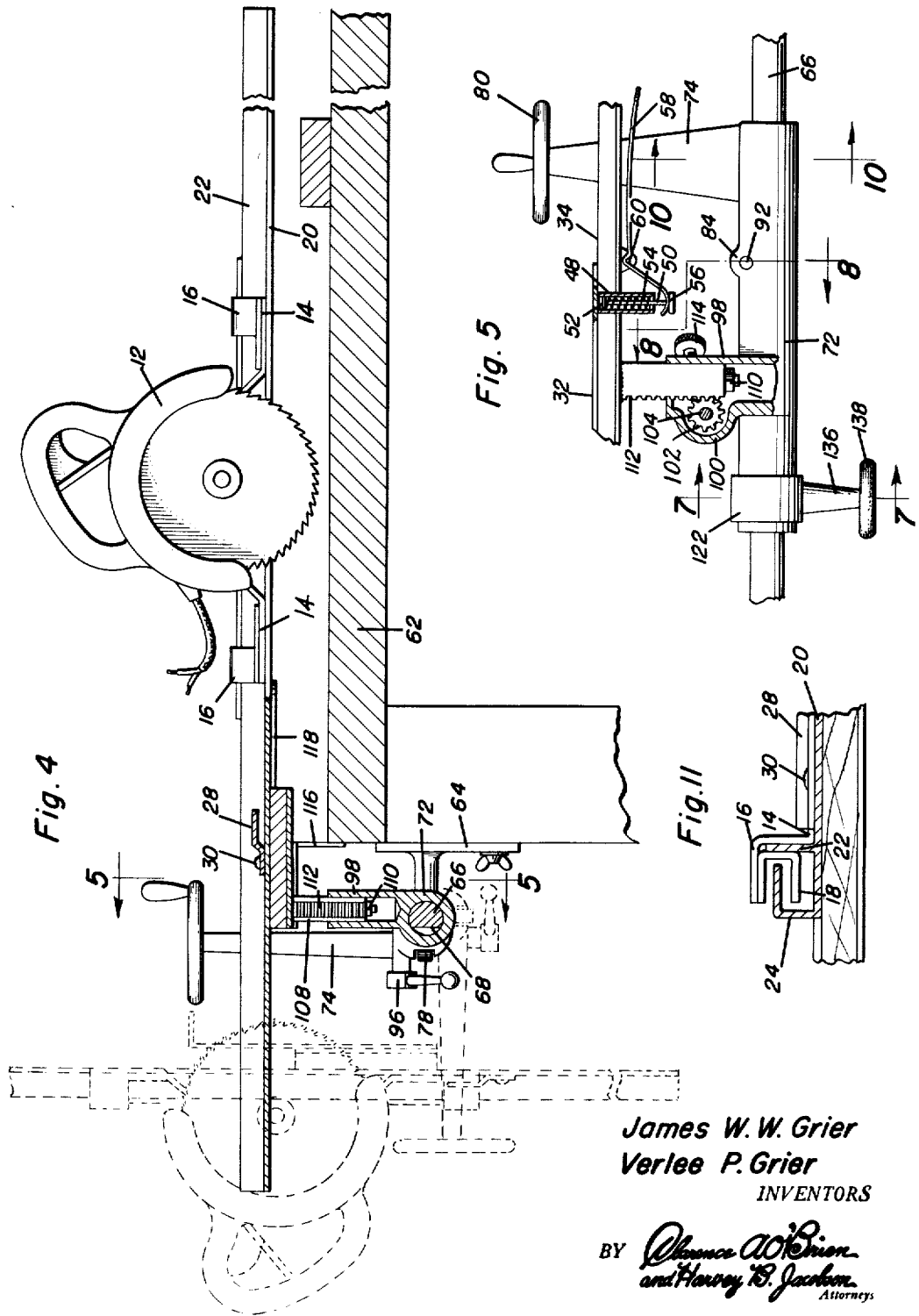

Feb. 21, 1956   J. W. W. GRIER ET AL   2,735,456
PORTABLE SAW GUIDE AND MITER ATTACHMENT
Filed Jan. 6, 1954   4 Sheets-Sheet 3
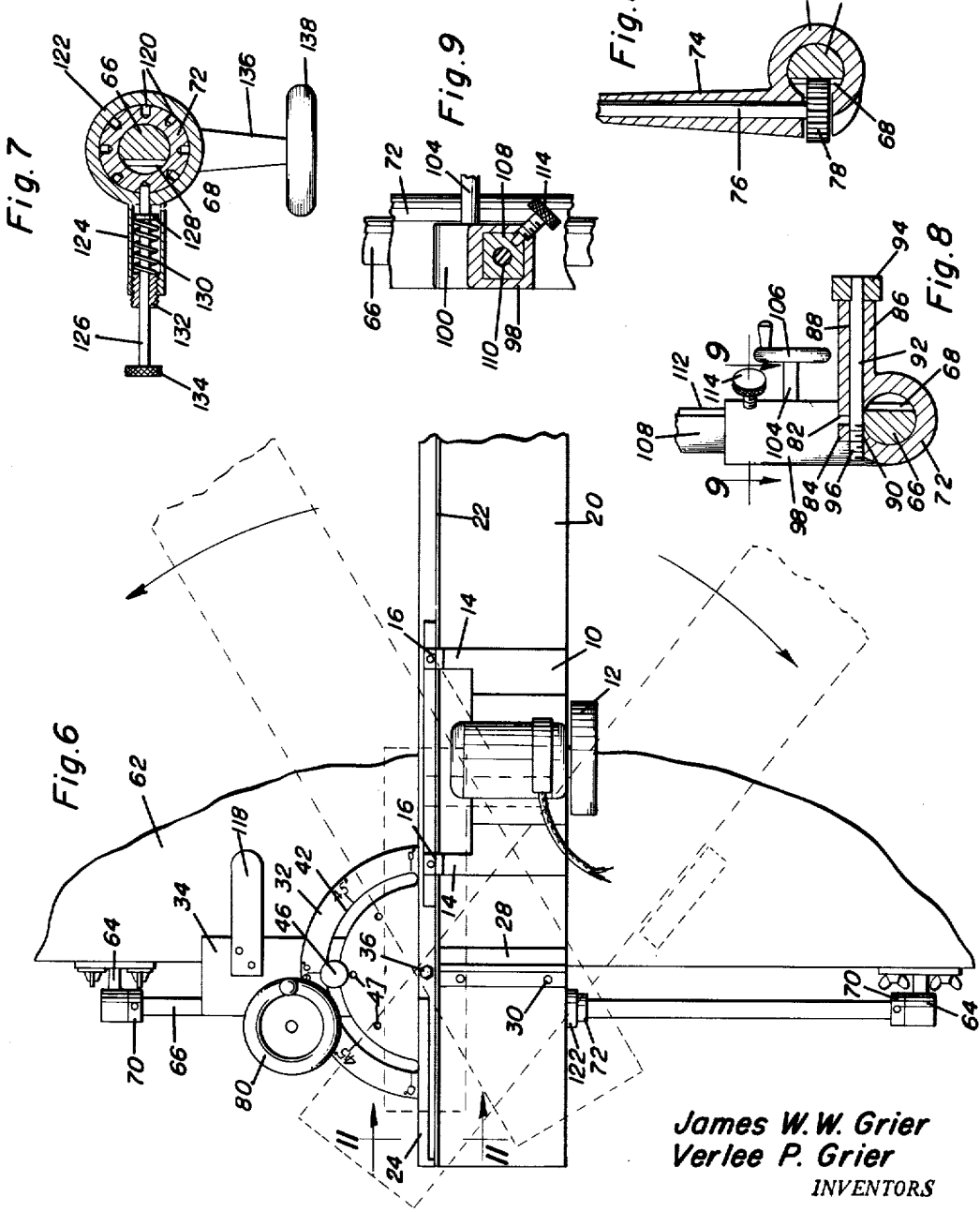
James W. W. Grier
Verlee P. Grier
INVENTORS

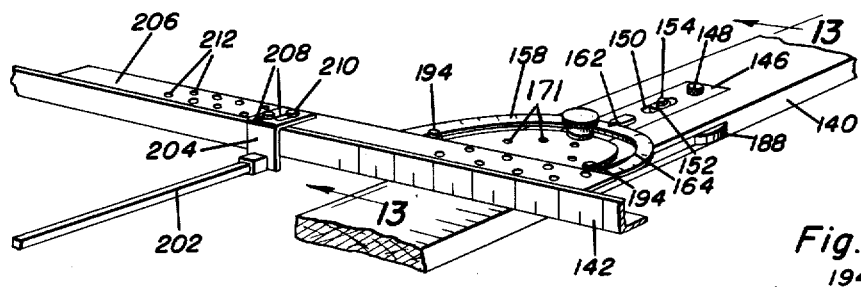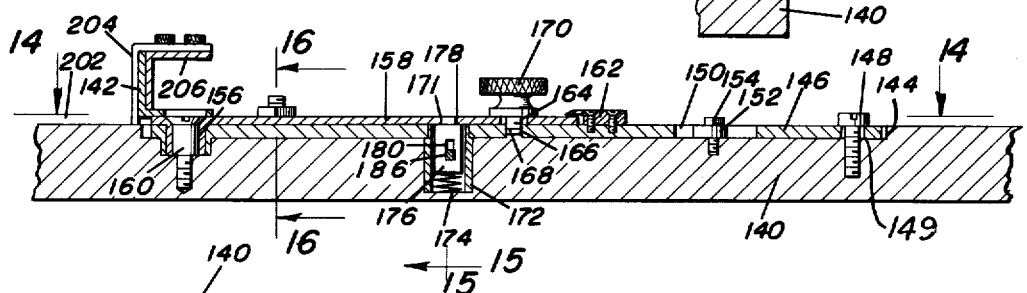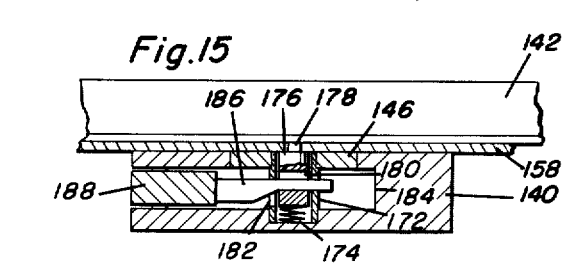

United States Patent Office 2,735,456
Patented Feb. 21, 1956

2,735,456
PORTABLE SAW GUIDE AND MITER ATTACHMENT

James W. W. Grier and Verlee P. Grier, Belmont, N. C.

Application January 6, 1954, Serial No. 402,506

5 Claims. (Cl. 143—6)

This invention relates to a saw guide and miter and more particularly to a device adapted to be secured to a portable hand saw for guiding the same for cutting boards at various angles.

An object of this invention is to provide a saw guide and miter attachment for a portable hand saw which may be adjusted to accurately guide a hand saw at any desired angle.

Another object of this invention is to provide a saw guide and miter attachment for a portable hand saw which is provided with an accurately graduated miter and having semi-automatic angle stops for certain angles and variable degree angle stops for the remaining angles.

A further object of this invention is to provide a saw guide and miter attachment having means thereon whereby boards are retained in a stationary position while the saw is moved longitudinally to saw one or more angles of the same degree, or one or more angles of different degrees.

A further object of this invention is to provide a saw guide and miter attachment which can be used without the saw as a regular square or an angle finder.

A still further object of this invention to provide a saw guide and miter attachment which can be simply and quickly attached to a regular hand saw.

A yet further object of this invention is to provide a saw guide and miter attachment which can be mounted in a fixed position whereby a portable saw can be guided as a cut-off or a radial saw.

A yet further object of this invention is to provide a saw guide and miter for a portable hand saw which is simple in design and use, extremely light in weight yet rigid and durable in construction and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the saw guide and miter forming the subject of this invention showing the attachment mounted in fixed position;

Figure 2 is a perspective view of one of the members forming the miter;

Figure 3 is a perspective view of the other of the members forming the miter;

Figure 4 is a sectional view taken substantially along the section line 4—4 of Figure 1;

Figure 5 is a sectional view taken substantially along the section line 5—5 of Figure 4;

Figure 6 is a top plan view of the device shown in Figure 1 with various positions of adjustment being shown in dotted lines;

Figure 7 is an enlarged sectional view taken substantially along the section line 7—7 of Figure 5;

Figure 8 is an enlarged sectional view taken substantially along the section line 8—8 of Figure 5;

Figure 9 is a sectional view taken substantially along the section line 9—9 of Figure 8;

Figure 10 is an enlarged sectional view taken substantially along the section line 10—10 of Figure 5;

Figure 11 (Sheet 2) is an enlarged sectional view taken substantially along the section line 11—11 of Figure 6;

Figure 12 (Sheet 4) is a perspective view of a modified form of saw guide and miter;

Figure 13 is a sectional view taken substantially along section line 13—13 of Figure 12;

Figure 14 is a sectional view taken substantially along section line 14—14 of Figure 13;

Figure 15 is a sectional view taken substantially along section line 15—15 of Figure 14;

Figure 16 is an enlarged sectional view taken substantially along the section line 16—16 of Figure 13; and Figure 17 is a sectional view taken substantially along section line 17—17 of Figure 14.

Referring now more specifically to the accompanying drawings it will be seen that the improved saw guide and miter forming the subject of this invention includes, a carriage 10 adapted to be secured to a conventional portable hand saw 12. The carriage 10 has extending from one side thereof, the side opposite the blade of the saw 12, a pair of arms 14 (Figure 6). The arms 14 are each provided with an upwardly offset portion 16 as best seen in Figure 11. Secured to the underside of each offset portion 16 is a U-shaped bracket 18. The brackets 18 open in a direction away from the saw 12.

The carriage 10 is adapted to be mounted for sliding movement on a plate 20. The blade of the saw lies outwardly of one side of the plate 20 and the brackets 18 are adapted to engage a track 22 extending along the other side edge of the plate 20. The track 22 is formed of a vertically extending member secured to the upper surface of plate 20 which member engages between the rear of the bracket 18 and the arm 14. One end of the plate 20 is provided with an angle member 24 extending upwardly therefrom and toward the vertical member of track 22. The member 24 is adapted to engage in the opening in bracket 18 as shown in Figure 11.

The plate 20 is provided with a plurality of pairs of spaced apertures 26 adjacent the end having bracket 24 thereon. A bracket 28 is adapted to be secured on the plate 20 by means of fasteners 30 extending into the apertures 26. The bracket 28 is provided with an offset portion which overlies the carriage 10 when the carriage is moved toward the end of plate 20 having bracket 24 thereon to limit the movement of the saw 12 in that direction.

The plate 20 is provided with a circular segment 32 extending from the side having the track 22 thereon. The circular segment is also positioned closely adjacent the end having bracket 24 thereon. A longitudinal member 34 is pivotally secured to the plate 20 at a point corresponding to the center of the circular segment 32. The member 34 is positioned so as to extend beyond the circular segment 32 but to terminate short of the side adjacent the blade of saw 12. A fastener 36 (Figure 6) extends through an aperture 38 in plate 20 and into an aperture 40 in member 34 for pivotally securing the members together.

The segment 32 is provided with an arcuate slot 42 adjacent its edge and member 34 is provided with an aperture 44 registering with slot 42. A fastener having a knurled knob 46 on one end extends through the slot 42 into the aperture 44 for frictionally clamping the segment 32 against the member 34. Thus, the member 34 can be set in various adjusted positions relative to the plate 20.

Semi-automatic means are provided for adjusting member 34 in certain angular positions with respect to member 20. This means comprises a plurality of apertures 47 in the segment 32. The apertures 47 are positioned in an arc corresponding to groove 42. The member 34 is provided with a bore receiving a cylinder 48, as seen in Figure 5. Extending through the cylinder 48 is a plunger 50 which extends above the upper surface of member 34. The plunger 50 is provided with an abutment 52 (Figure 5) and a coil spring 54 is disposed about the plunger 50. The spring 54 urges the plunger 50 upwardly into engagement with the apertures 46 of segment 32.

The lower end of plunger 50 is provided with an abutment 56. A lever 58 is pivoted to the lower surface of member 34 as at 60. One end of lever 58 engages the abutment 56 on plunger 50 whereby movement of the other end of lever 58 will withdraw the plunger 50 from the apertures 46 to allow the member 34 to be adjusted angularly with respect to member 20. Means are provided for mounting the device on a bench 62. This means comprises a pair of brackets 64 which are secured to the face of the bench 62. A shaft 66 is rotatably mounted on the brackets 64. One side of the shaft 66 is provided with a plurality of teeth 68. Each end of the shaft 66 is provided with a collar 70 secured thereto and engaging against opposing faces of brackets 64 to prevent longitudinal movement of the shaft 66 with respect thereto.

Slidably mounted on the shaft 66 is a sleeve 72. One end of the sleeve 72 is provided with an integral housing 74 extending at right angles thereto. A shaft 76 (Figure 10) extends through the housing 74 and is provided with a gear 78 meshing with the teeth 68 on shaft 66 for moving the sleeve 72 longitudinally along the shaft 66. The upper end of the shaft 76 is provided with a knob 80 for imparting rotation to shaft 76 and gear 78.

In order to lock the sleeve 72 in adjusted longitudinal position on the shaft 66 the sleeve 72 is provided with a slot 82 positioned substantially midway along the sleeve. The sleeve 72 is provided with an upstanding ear 84 (Figure 8) at one side of slot 82 and a projection 86 extending tangentially to the sleeve 72 at the other side of slot 82. A projection 86 is provided with a longitudinal bore 88 and ear 84 is provided with an internally threaded aperture 90 in axial alignment with the bore 88. A pin 92 having a knob 94 at one end and a threaded portion 96 at the other end is inserted through the bore 88 and into the threaded aperture 90. Thus tightening of the pin in the aperture 90 will cause the slot 82 to be narrowed and the sleeve 72 will frictionally clamp the shaft 66 to prevent longitudinal movement of the sleeve 72 on the shaft 66. The saw can be adjusted longitudinally of a board on the bench by rotating knob 80 instead of moving the board to the desired position of cut.

Disposed between the housing 74 and slotted portion 82 of the sleeve 72 is an upwardly extending member 98 (Figures 4, 5 and 8). The member 98 is hollow and is provided with an open upper end. One side of the member 98 is offset as at 100 and receives therein a gear 102 for rotation about a horizontal axis. The gear 102 is fixedly secured to a shaft 104 which extends from one side of portion 100. The outer end of shaft 104 is provided with a knob 106 (Figure 8) for imparting rotation to shaft 104 and gear 102.

A rod 108 is secured to the undersurface of member 34 by a bolt 110 (Figures 4 and 5). The rod 108 extends downwardly from the member 34 and is provided with a plurality of teeth 112 along one side thereof. The rod 108 is inserted in member 98 with the teeth 112 in engagement with the gear 102. Thus rotation of shaft 104 will cause the gear 102 to be rotated thereby raising or lowering member 34 with respect to the top of bench 62. A set screw 114 (Figure 9) extends through member 98 for engaging rod 108 to lock the rod 108 in adjusted vertical position.

The member 34 is provided with a downwardly extending member 116 (Figures 2 and 4) which engages the face of the bench 62. The member 116 serves as a guide for member 34 during vertical movement thereof as well as to prevent boards which are being cut from striking the adjusting mechanism. Secured to the edge of member 34 which overlies the bench 62 is a tab member 118. The tab 118 extends in the same direction as the major portion of member 20 and serves to retain the board being cut in position.

Means are provided for positioning the device in various vertical angular positions in a vertical plane with respect to the bench 62. This means comprises a plurality of circumferentially spaced recesses 120 (Figure 7) in the sleeve 72 adjacent one end thereof. A collar 122 (Figures 1, 5 and 7) is rotatably mounted on the one end of sleeve 72 in overlying relationship with respect to the recesses 120. A housing 124 extends from one side of collar 122. Disposed within the housing 124 is a plunger 126 which passes through an aperture in the collar 122 into a selected recess 120. The plunger 126 is provided with an abutment 128 thereon within the housing 124 and a coil spring 130 is disposed on the plunger 126 in engagement with the abutment 128 and a plug 132 closing the outer end of housing 124. Thus the spring 130 will urge the plunger into engagement with a selected one of recesses 120. The outer end of plunger 126 is provided with a knob 134 whereby the plunger can be gripped to move the same out of engagement with a selected recess 120.

Fixedly secured to the collar 122 and extending outwardly therefrom is an arm 136. Secured to the outer end of arm 136 is a resilient bumper 138. Thus the angular position of the bumper 138 with respect to sleeve 72 may be adjusted by means of the plunger 126. The bumper 138 is then placed in engagement with the bench 62 and the vertical angular position of the device will be controlled by the positioning of the bumper.

From the above description it will be seen that when the device is mounted on a bench and the hand saw is mounted thereon the device will function as a bench saw whereby boards may be cut at various angles. Further the device may be set to accommodate boards of various thicknesses as well as various lengths.

Referring now to Figures 12 to 17 there is disclosed a portable attachment which can be transported for use on a construction job and used in difficult places.

The attachment shown in Figures 12 to 17 comprises a member 140 having pivotally secured to the upper face thereof a member 142. The member 140 is provided with a recessed portion 144. An elongated flat plate 146 is disposed within the recess 144 so as to have the upper face thereof even with the upper face of member 140, said recess being larger than plate 146 and providing a space around the perimeter of said plate. A screw 148 extends through an enlarged opening at 149 one end of plate 146 to secure the plate to the member 140.

Adjacent the screw 148 the plate 146 is provided with a longitudinal slot 150. Disposed within the slot 150 is an eccentric 152 which is secured to a screw 154 extending into member 140. By rotating screw 154 the eccentric 152 will provide a limited movement to cause the plate 146 to be aligned with the longitudinal axis of member 140.

The other end of plate 146 is provided with a cylindrical recess 156. The member 142 is formed of an angle iron member having a horizontal portion and a vertically rising portion. Secured to and extending from one side of the horizontal portion of member 142 adjacent one end is a semi-circular segment 158. A screw 160 having a bearing portion extends through the member 142 at the radial center of segment 158 and into the recess 156 in plate 146. Thus the member 142 is mounted for angular movement with respect to the member 140.

The outer edge of segment 158 is provided with angular markings and the plate 146 is provided with an indicator 162 extending upwardly therefrom and overlying the segment 158 whereby the angle may be read to fix the positions of members 140 and 142. The segment 158 is also provided with an arcuate slot 164 adjacent the curved edge thereof. The plate 146 is provided with an internally threaded aperture 166 in alignment with slot 164. A threaded bolt 168 having a knurled knob 170 at one end thereof is inserted through the slot 164 and into aperture 166, whereby when the screw is tightened in the aperture the segment 158 will be frictionally locked against member 140 to retain the members 140 and 142 in fixed relative positions.

In order to provide for semi-automatic adjustment of the members to certain angular positions the segment 158 is provided with a plurality of spaced apertures 171. The apertures 171 are positioned in an arc inwardly of slot 164. The plate 146 is provided with a hollow cylinder 172 extending downwardly into the member 140. The cylinder 172 is aligned selectively with the apertures 170. Disposed in the bottom of cylinder 172 is a coil spring 174. Also disposed in the cylinder 172 is a plunger 176 having a pin 178 extending from the upper end thereof. The spring 174 urges the plunger 176 upwardly to cause the pin 178 to move into engagement with a selected one of the apertures 170.

Means are provided for moving pin 178 out of engagement with the apertures 170. This means comprises a transverse slot 180 in the plunger 176 and a transverse slot 182 in the wall of cylinder 172. The member 140 is provided with a cut out portion 184 registering with the transverse slots 180 and 182. A finger 186 having a lower cam surface is disposed in the cut out portion 184 and extends through slot 182 into slot 180. Thus, when the finger 186 is moved into the slots 182 and 180 the plunger 176 will be retracted into cylinder 172.

In order to actuate finger 186 a lever 188 is pivotally secured at one end in the cut out portion 184 by a pin 190. One side of lever 188 engages the finger 186 for moving the pin into the slots 180 and 182. The other end of lever 188 is engaged by a spring pressed detent 192 for frictionally retaining the lever 188 in adjusted position.

At times it is desirable to move the members 140 and 142 between two limits for making corresponding angular cuts. In order to provide a means whereby the members will automatically assume these positions the slots 164 are provided with adjustable stops 194. The stops 194 consist of a threaded bolt 196 having a head portion 198 at one end. The bolts 196 are inserted in the slots 164 and a nut 200 is threaded on the other end thereof. The nuts are securely tightened to retain the stops 194 in adjusted position. Thus, as the members 140 and 142 are moved relative to one another member 140 will engage the stops 194 which will limit the movement of the members.

Means are provided for mounting a hand saw on the device. This means comprises arms 202, one of which is shown in Figure 12, adapted to be secured to the saw. The arms 202 are provided with offset brackets 204 at one end thereof. These brackets 204 are secured to an angle iron member 206. The angle member 206 and the brackets 204 form a vertical channel to receive the vertical portion of member 142. Thus, the saw can be guided longitudinally along the member 142. In order to provide an adjustment for the width of the channel formed by brackets 204 and member 206 the brackets are provided with longitudinal slots 208. Screws 210 extend through the slots 208 and into threaded apertures 212 in member 206.

The modification of Figures 12 to 17 can be provided with conventional markings on members 140 and 142 whereby the device may be used as an ordinary square when the saw is removed. With the saw attached the device becomes an accurate guide for positioning and guiding the saw for miter cuts.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A saw guide and miter attachment for use with a portable hand saw comprising a carriage adapted to be secured to the saw, a first elongate plate having a track along one edge thereof, means on said carriage engaging said track for supporting the carriage for longitudinal movement on said track, said saw having the blade thereof lying closely adjacent the other side of said first plate and extending below the lower surface thereof, and a second plate pivotally secured adjacent one end to said first plate, said second plate engaging the lower surface of said first plate and lying in a plane parallel to the plane of said first plate, said first elongate plate and track having a portion extending beyond the pivotal connection with the second plate, an additional channel member located on said portion adjacent the track to interlock with the track engaging means on the saw carriage when the carriage is positioned on said portion of the track and a further transverse retaining member adjustably positioned at the end of said portion and having a portion adapted to overlie the rear end of said saw carriage.

2. A saw guide and miter attachment for use with a portable hand saw comprising a carriage adapted to be secured to the saw, a first elongate plate having a track along one edge thereof, means on said carriage engaging said track for supporting the carriage for longitudinal movement on said track, said saw having the blade thereof lying closely adjacent the other side of said first plate and extending below the lower surface thereof, and a second plate pivotally secured adjacent one end to said first plate, said second plate engaging the lower surface of said first plate and lying in a plane parallel to the plane of said first plate, means connecting said second plate to said first plate for adjusting said second plate to various angular positions with respect to said first plate, said first elongate plate and track having a portion extending beyond the pivotal connection with the second plate, an additional channel member located on said portion adjacent the track to interlock with the track engaging means on the saw carriage when the carriage is positioned on said portion of the track and a further transverse retaining member adjustably positioned at the end of said portion and having a portion adapted to overlie the rear end of said saw carriage.

3. A saw guide and miter attachment for use with a portable hand saw comprising a carriage adapted to be secured to the saw, a first elongate plate having a track thereon for guiding the carriage for longitudinal movement, a second plate pivotally secured adjacent one end to said first plate and lying in a plane parallel to said first plate, means connecting said second plate to said first plate for adjusting the angle between said plates, an elongated supporting member arranged parallel to said second plate and adapted to be secured to the edge of a table and means mounting said second plate on the supporting member for longitudinal movement of the attachment and saw carriage along the table.

4. The structure as set forth in claim 3, wherein the mounting means is in the form of a sleeve member slidable on the elongated supporting member, said sleeve member including a vertically adjustable rod attached to the second plate, whereby the attachment and saw carriage may be raised and lowered with respect to the table surface.

5. The structure as set forth in claim 4, wherein the elongated supporting member is rotatably mounted in end bearings, whereby the entire saw attachment may be tilted relative to the table.

References Cited in the file of this patent

UNITED STATES PATENTS

| | | |
|---|---|---|
| 1,828,043 | Hedgpeth | Oct. 20, 1931 |
| 2,169,517 | Biro | Aug. 15, 1939 |
| 2,620,835 | Barnhart | Dec. 9, 1952 |
| 2,627,287 | McCluskey | Feb. 3, 1953 |
| 2,634,767 | Chappell | Apr. 14, 1953 |